Figure 1:
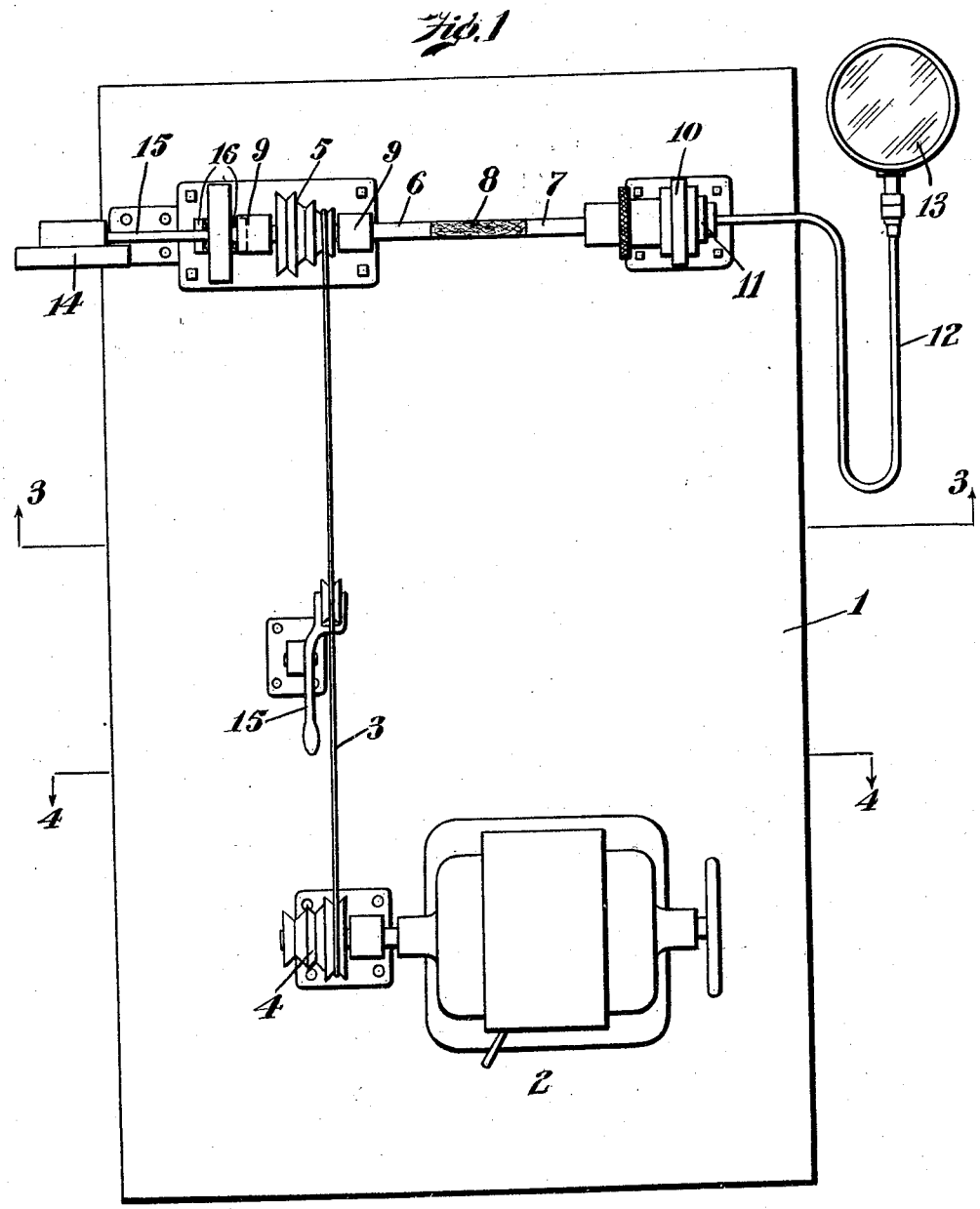

Oct. 25, 1932.  P. C. WENTWORTH ET AL  1,885,022

STROBOSCOPIC APPARATUS

Filed March 12, 1928  2 Sheets-Sheet 1

Inventor
Philip C. Wentworth
James H. Avery
By Attorney

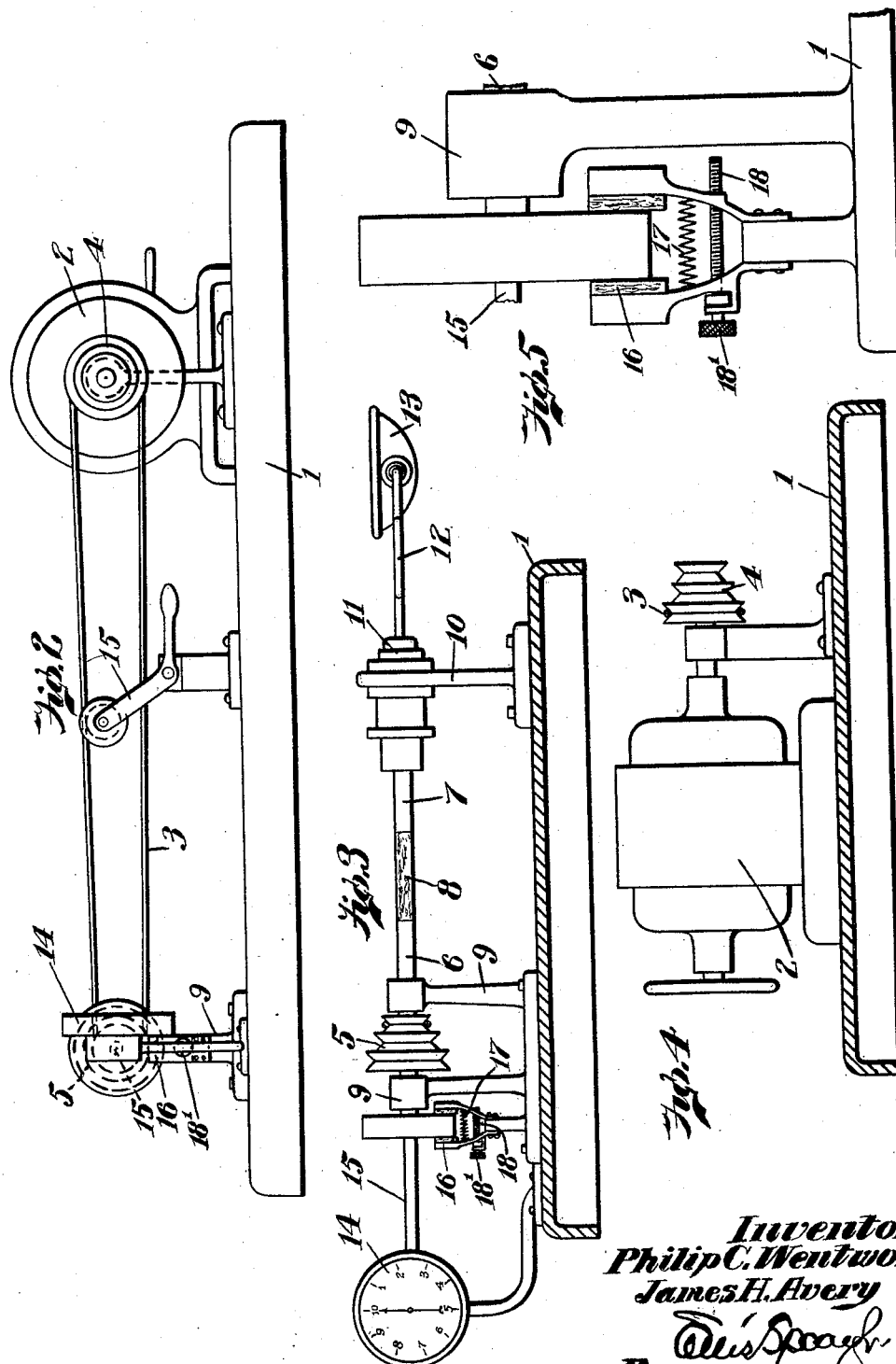

Patented Oct. 25, 1932

1,885,022

UNITED STATES PATENT OFFICE

PHILIP C. WENTWORTH, OF PROVIDENCE, RHODE ISLAND, AND JAMES H. AVERY, OF FRANKLIN, MASSACHUSETTS, ASSIGNORS TO NATIONAL RING TRAVELER CO., OF PROVIDENCE, RHODE ISLAND, A CORPORATION OF RHODE ISLAND

STROBOSCOPIC APPARATUS

Application filed March 12, 1928. Serial No. 261,150.

Our present invention relates to observational devices by which mechanical parts in motion may be observed in apparently stationary position, and particularly to such equipment including a control by which the relative speeds of two parts or variations in the speed of a single part may be observed and compared while having at the same time the moving part under observation for characteristics which may be related to its speed of rotation.

Our invention is capable of use with various types of such observation instruments which are usually of two general classes in which the object is either observed by an interference of vision, as by a rotating shutter, or by interruption of vision as by an intermittent light source.

While such devices have been of recognized value their field of usefulness has been considerably limited owing to the initial difficulty of establishing a proper intermittence and the still greater difficulty of varying the rate of interruption when once it had been established. By our invention we are enabled to accomplish results in both directions and also to establish a basis of comparison which opens up new sciences in some old fields of work.

As illustrated in our invention we have shown a simple form of apparatus illustrated for use in connection with a device operating upon the interruptance of illumination, although adapted to other types. Throughout the specification and drawings like reference characters are employed to indicate corresponding parts, and in the drawings:

Fig. 1 is a plan view of a characteristic lay out.

Fig. 2 a side elevation of the same.

Fig. 3 a section on the line 3—3, of Fig. 1.

Fig. 4 a section on the line 4—4, of Fig. 1, and

Fig. 5 an end view of the brake.

In the embodiment shown we have illustrated a portable apparatus capable of being taken to the machine or other object to be observed. It comprises as shown a base 1 on which is mounted a variable speed motor 2 which may be belted as at 3 through change speed pulleys 4 and 5, to a shaft 6. The shaft 6 is shown as united to an aligned section 7 and connected by a flexible connector 8, the two shafts being mounted in bearings 9 and 10. On the end of the shaft 7 is an interrupter 11. As indicated this is a make and break device of any ordinary type adapted to intermittently make and break the circuit through a cable 12 which supplies current to a small projector 13 by means of which a beam of light may be projected on any rotating part which is to be observed.

We have referred to the part 11 as an interrupter and while this is with the type of observation apparatus used as electrical interrupter, it will be understood that where the interruption of vision is accomplished by the interference type of apparatus, this interrupter may be an apertured disc or other means of effecting interruptive vision of the part to be observed.

The shaft 6 has attached to its end a tachometer 14 connected by its spindle 15 so as to indicate the speed of the combined shaft 6, 7, 8, as it is driven by the motor 2. Through the belt tightener 15 this sped may be established through the regulation of the motor and the pulley ratio to any desired number of rotations per minute. It will be understood that while the motor is shown and is for many reasons convenient as an independent and positive drive, such a drive may be obtained by connecting up the interrupter shaft with any driven part, as for example, the spindle drive of a spinning or twisting frame.

With such a drive so established and using the device by way of illustration for the observation of the ring traveler, it will be seen that the interrupter shaft 6, 7, 8, can be brought to the speed of the spindle, this being picked up by the observation of the spindle with a projector 13 until any given part of the spindle, as for example, a spot is apparently brought to a stand still. From this the spindle speed can be read from the tachometer and the exact speed of the spindle observed can be known.

In the observation of such apparatus as that involved in ring spinning, it is of the greatest importance to determine the lag of the traveler behind the spindle because upon this observation and the attitude of the traveler while in motion on the ring depends the correctness of those adjustable factors which control the size and character of the yarn being produced.

It will be understood that the spindle speeds vary from frame to frame and even among the individual spindles of any frame there is apt to be variance so that it is of great importance to know positively the rotative speed of the spindle whose weaving traveler is under observation. This is true whether the observation is simply one of study of a perfectly acting traveler, or, as is usually the case, the study of a spindle equipment which is not functioning properly so as to determine which one of the several factors involved requires variation. This usually is a matter of substitution of the traveler itself and generally a matter of the traveler weight which may not have been adapted to the spindle speed or the character of the yarn to be produced.

Having thus established a spindle speed as recorded by the tachometer, we then apply a drag or effect a retardation of the interrupter shaft by a brake. This may be done conveniently as shown in Fig. 5, in which we have shown a pair of jaws 16 normally expanded by a spring 17 and tightened by a screw 18 having a knurled head 18¹. This friction effects a slight retardation of the interrupter shaft 6, 7, 8, until the interruption of the light source 13 is sufficiently retarded to cause the traveler to appear to stand still. Under usual operating conditions the traveler will not appear to stand absolutely still, or if so, only momentarily, but will appear to move slightly in one direction or another as its rate of retardation behind that of the spindle is never absolutely constant and this factor is also an observable factor indicating possible defects.

The estimated reluctance or rotational delinquency of the traveler is theoretically about 10% of the required spindle speed. In observing the traveler its speed may be read from the tachometer and its rotative rate determined and its percentage of delinquence discovered. Furthermore, during the observation of the traveler due to the nicety of control of the interrupter shaft, it is possible to hold the traveler very close to a stationary position or sufficiently so to observe its attitude on the ring. While apparatus in accordance with our invention is capable of a wide variety of usage, this matter of traveler observation is believed to afford such a supreme test that it is believed pertinent to note that by the term "attitude of the traveler" is meant its position with reference to the web and flanges of the spinning ring on which it moves.

It will be understood that the traveler in theory should float about the ring without actual contact. This, of course, is theoretical and not actually attainable, but departures from such an attitude tend towards serious difficulties. For example, if the traveler is too light for the actual spindle speed it tends to be thrown outwardly by the centrifugal action. If too heavy, its reluctance is such that it is drawn radially of the ring. In either case the horns of the traveler produce undue friction on the ring which accentuates the retard of the traveler, varies the size of the yarn and produces destructive wear on the traveler or what is worse, upon the ring itself. Such wear at the very high speed of the traveler multiplies to such an extent that in a very short time the operating efficiency of the spindle is lost, waste is produced and actual destruction of the expensive ring is effected.

The apparatus shown is very simple and of course capable of a wide field of variation. As above stated the nature of the observational device is optional, that shown being selected as of a type well adapted for use in such places as spinning rooms where conditions are crowded and where by the very requirements of the observations to be made, the frames must be in actual operation and under working conditions. Our inventive concept is therefore to be understood as not limited to the apparatus shown, which while of convenient and practical design is capable of modification and change.

What we therefore claim and desire to secure by Letters Patent is:—

1. Stroboscopic apparatus for determining the necessary factors to establish the proper relationship between the spindle, ring and traveler used in ring spinning and twisting yarn comprising a base, a variable speed motor mounted on said base and having a shaft, an interrupter shaft mounted on said base, driving connections from the shaft of said motor to said interrupter shaft, for driving said interrupter shaft at speeds regulatable to the varying speed of the spindle and traveler relative to each other, said interrupter shaft formed as a pair of aligned sections flexibly connected together, an interrupter driven from one of said shaft sections for determining stroboscopically the speed of the spindle and the traveler relative to each other so that the relation of the traveler to the ring may be observed with the stroboscope at the speed obtained, a tachometer driven from the other shaft section, and a frictional retarding device for said interrupter shaft.

2. Stroboscopic apparatus for determining the necessary factors to establish the proper relationship between the spindle, ring and traveler used in ring spinning and twisting yarn, comprising a base, a variable speed motor mounted on said base and having a shaft, an interrupter shaft mounted on said base, change speed pulleys on said motor and interrupter shafts and a belt connecting said pulleys for driving said interrupter shaft at speeds regulatable to the varying speed of the spindle and traveler relative to each other, said interrupter shaft formed as a pair of aligned sections flexibly connected together, an interrupter driven from one of said shaft sections for determining stroboscopically the speed of the spindle and the traveler relative to each other so that the relation of the traveler to the ring may be observed with the stroboscope at the speed obtained, a tachometer driven from the other shaft section, and a frictional retarding device for said interrupter shaft.

3. Stroboscopic apparatus for determining the necessary factors to establish the proper relationship between the spindle, ring and traveler used in ring spinning and twisting yarn, comprising a base, a variable speed motor mounted on said base and having a shaft, an interrupter shaft mounted on said base, change speed pulleys on said motor and interrupter shafts and a belt connecting said pulleys for driving said interrupter shaft at speeds regulatable to the varying speed of the spindle and traveler relative to each other, an interrupter driven from said interrupter shaft for determining stroboscopically the speed of the spindle and the traveler relative to each other so that the relation of the traveler to the ring may be observed with the stroboscope at the speed obtained and a tachometer also driven from said interrupter shaft.

In testimony whereof we affix our signatures.

PHILIP C. WENTWORTH.
JAMES H. AVERY.